US011351486B2

(12) United States Patent
Kemmer

(10) Patent No.: US 11,351,486 B2
(45) Date of Patent: Jun. 7, 2022

(54) INTERNAL RETICULATED FOAM FILTER FOR A WATER FILTRATION TANK

(71) Applicant: Walter Tom Kemmer, Phoenix, AZ (US)

(72) Inventor: Walter Tom Kemmer, Phoenix, AZ (US)

( * ) Notice: Subject to any disclaimer, the term of this patent is extended or adjusted under 35 U.S.C. 154(b) by 216 days.

(21) Appl. No.: 16/932,606

(22) Filed: Jul. 17, 2020

(65) Prior Publication Data
US 2021/0016207 A1 Jan. 21, 2021

Related U.S. Application Data

(63) Continuation-in-part of application No. 29/698,706, filed on Jul. 18, 2019, now Pat. No. Des. 905,198.
(Continued)

(51) Int. Cl.
B01D 29/58 (2006.01)
C02F 1/00 (2006.01)
(Continued)

(52) U.S. Cl.
CPC ............. B01D 29/58 (2013.01); B01D 29/25 (2013.01); C02F 1/001 (2013.01); C02F 1/006 (2013.01);
(Continued)

(58) Field of Classification Search
CPC ........ B01D 2201/0438; B01D 2201/06; B01D 2201/16; B01D 29/25; B01D 29/58;
(Continued)

(56) References Cited

U.S. PATENT DOCUMENTS 3,382,978 A * 5/1968 Rosaen .................. B01D 29/15
210/90
3,550,774 A 12/1970 Hirs
(Continued)

FOREIGN PATENT DOCUMENTS

CN 102458601 A 5/2012
FR 607088 A * 6/1926 ........... B01D 35/023

OTHER PUBLICATIONS

Nelsen Corporation, CANPRO-485, 4 Cart Sys w/KDF85 Media, CANPRO-4-SC, Retrieved from Internet, Retrieved on Nov. 2, 2019 <URL: https://www.nelsencorp.com/itemdetail/CANPRO-485>.

*Primary Examiner* — Terry K Cecil

(57) ABSTRACT

An internal reticulated foam filter for a water filtration tank is an apparatus that thoroughly filters water of a variety of water filtration tanks. The apparatus includes a flow-management assembly, at least one inner tube, at least one outer tube, and a plurality of foam filters. The flow-management assembly positions the apparatus around a distributing tube of a water filtration tank. The at least one inner tube upholds the plurality of foam filters against a central tube of the distributing tube. The at least one outer tube releases the water filtered by the plurality of foam filters back into the water filtration tank. The flow-management assembly also includes a first cap, a second cap, a plurality of main inlets, a plurality of channels, and a plurality of main outlets. The plurality of main inlets is in fluid communication with the plurality of main outlets through the plurality of channels.

20 Claims, 5 Drawing Sheets

Related U.S. Application Data

(60) Provisional application No. 62/875,100, filed on Jul. 17, 2019.

(51) Int. Cl.
*B01D 29/25* (2006.01)
*B01D 35/02* (2006.01)

(52) U.S. Cl.
CPC .... *B01D 35/023* (2013.01); *B01D 2201/0438* (2013.01); *B01D 2201/06* (2013.01); *B01D 2201/16* (2013.01)

(58) Field of Classification Search
CPC ..... B01D 35/023; B01D 35/027; C02F 1/001; C02F 1/006
USPC ................. 210/172.6, 172.3, 172.4, 172.2
See application file for complete search history.

(56) References Cited

U.S. PATENT DOCUMENTS

| | | | |
|---|---|---|---|
| 3,552,553 A | 1/1971 | Reading | |
| 3,666,101 A * | 5/1972 | Rosaen | B01D 29/54 210/90 |
| 3,814,247 A | 6/1974 | Hirs | |
| 3,876,546 A | 4/1975 | Hsiung | |
| 5,980,759 A | 11/1999 | Proulx | |
| 10,173,153 B2 * | 1/2019 | Greco | B01D 29/23 |
| 10,617,981 B2 * | 4/2020 | Bautz | B01D 29/23 |
| D905,198 S | 12/2020 | Kemmer | |

* cited by examiner

INTERNAL RETICULATED FOAM FILTER FOR A WATER FILTRATION TANK

The current application claims a priority to the U.S. provisional patent application Ser. No. 62/875,100 filed on Jul. 17, 2019.

FIELD OF THE INVENTION

The present invention generally relates to water filters. More specifically, the present invention is an internal reticulated foam filter for a water filtration tank.

BACKGROUND OF THE INVENTION

An objective of the present invention is to provide an option for a new interior reticulating foam-media water filter that wraps around the tank's distributor with built-in chambers for different foam media sections. Close to 100% of the water flow is directed through each foam chamber of the interior filter allowing progressive filtration based on how the media are assembled into the filter.

The present invention provides separate chambers for individual media contact inside a multi-chamber distributing tube with non-backwashing or backwashing valves for whole house water filtration tanks. Each reticulated foam media section can be placed on top of each other or separated so that the water flow can be directed through the sequence of filtration desired and so no cross contamination of media can occur. In addition, the reticulated foam media sections make it impossible for media solidification as previously experienced in existing granular media-based tanks which utilize mixed media. The internal reticulated foam distributor allows for media sections to fully contact the media to get maximum contact time and therefore, maximum intended contaminant removal. Further, the present invention while accompanied with a backwashing valve, backwashes out any impurities that may be collected during the filtering cycle.

DETAIL DESCRIPTIONS OF THE INVENTION

All illustrations of the drawings are for the purpose of describing selected versions of the present invention and are not intended to limit the scope of the present invention.

Figure 1:
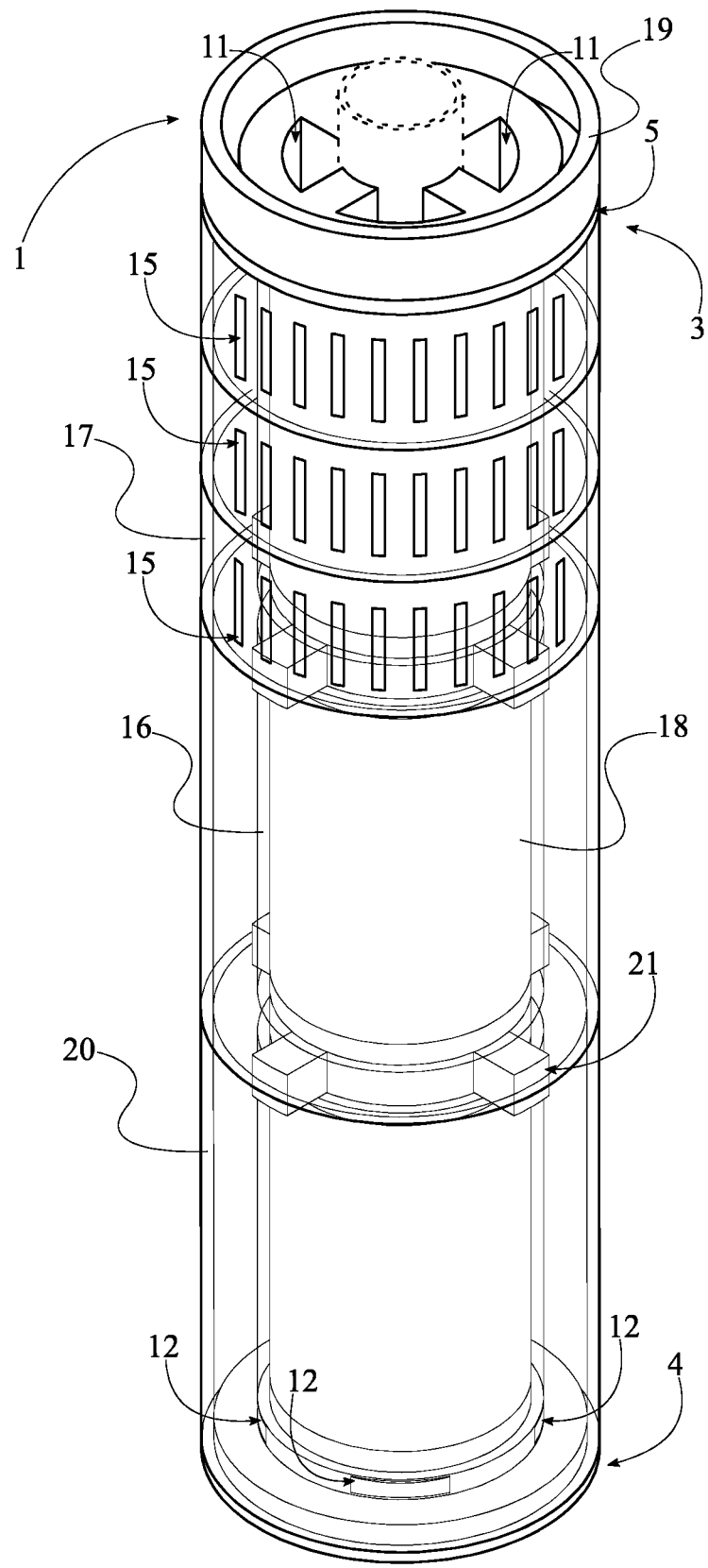
FIG. 1 is a top perspective view of the present invention engaged with a distributing tube of a water filtration tank.

The present invention is an internal reticulated foam filter for a water filtration tank. The present invention comprises a flow-management assembly 1, at least one inner tube 16, at least one outer tube, and a plurality of foam filters 18, as seen in FIG. 1. The flow-management assembly 1 attaches the present invention with a distributing tube of a water filtration tank. Furthermore, the flow-management assembly 1 positions the at least one inner tube 16, the at least one outer tube 17, and the plurality of foam filters 18 adjacent to a valve of the water filtration tank in order to thoroughly filter the water entering into the water filtration tank. In order for the flow-management assembly 1 to direct the flow of water through the plurality of foam filters 18 and between both the at least one inner tube 16 and the at least one outer tube 17, the flow-management assembly 1 comprises a first cap 3, a second cap 4, a dispensing-tube-receiving channel 2, a plurality of main inlets 11, a plurality of channels 12, and a plurality of main outlets 15. The first cap 3 and the second cap 4 position and connect the at least one inner tube 16 and the at least one outer tube 17 with each other. The dispensing-tube-receiving channel 2 allows the dispensing tube to traverse through the first cap 3 and the second cap 4. The plurality of main inlets 11 serves as the entry point for water from the water valve to enter the present invention. The plurality of channels 12 manages the water flow and water pressure within the present invention as the water traverses from the plurality of main inlets 11 to the plurality of main outlets 15. The plurality of main outlets 15 releases filtered water from the present invention into the water filtration tank. In order to effectively control water flow within the present invention, the at least one inner tube 16 positions and orients the plurality of foam filters 18. The water flow is directed out of the present invention with the at least one outer tube 17. The plurality of foam filters 18 removes any debris or impurities from the water entering the present invention and being released into the water filtration tank.

Figure 3:
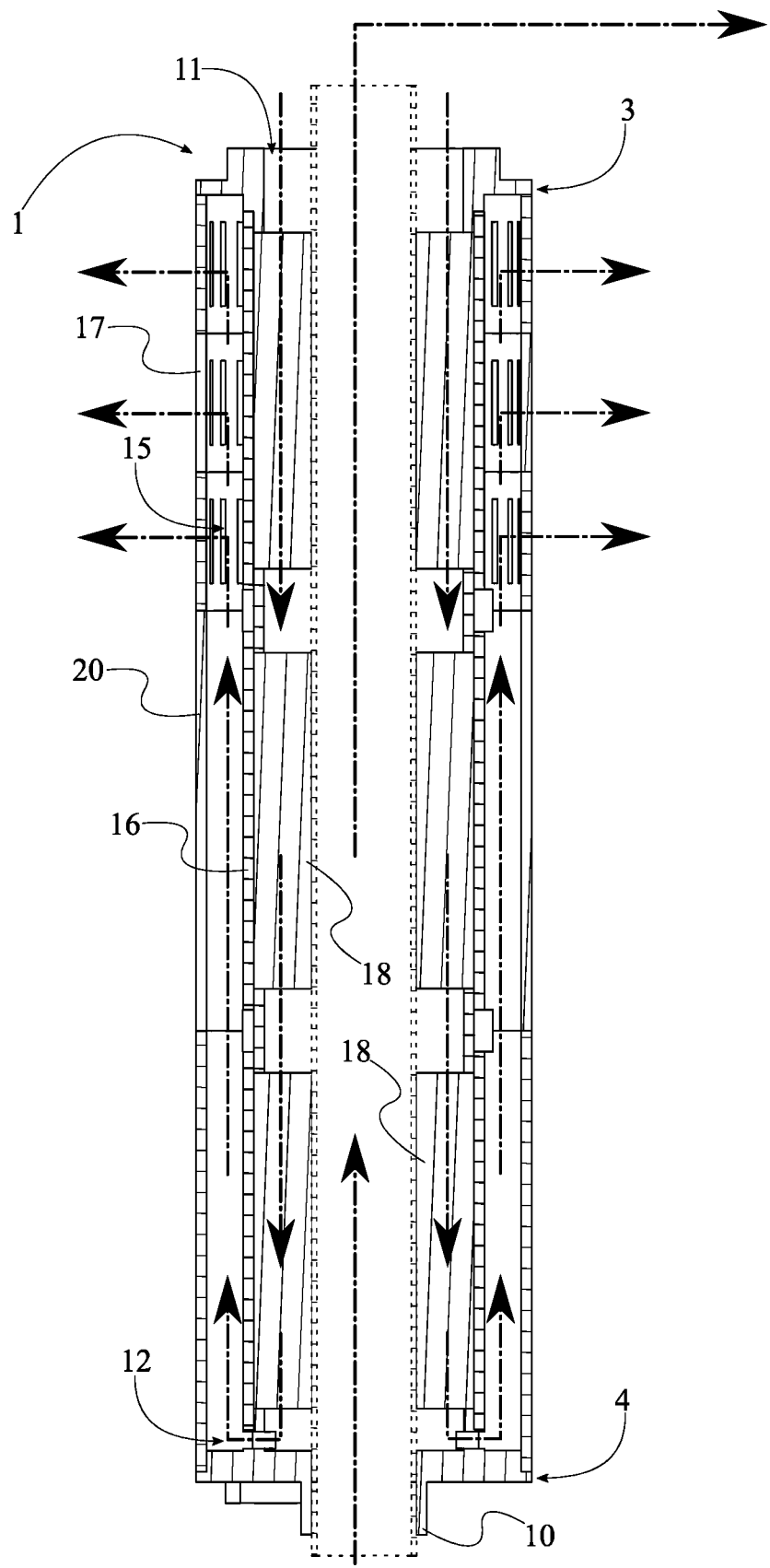
FIG. 3 is a schematic view of the fluid communication between a plurality of main inlets, a plurality of channels, and a plurality of main outlets of the present invention engaged with the distributing tube.
Figure 4:
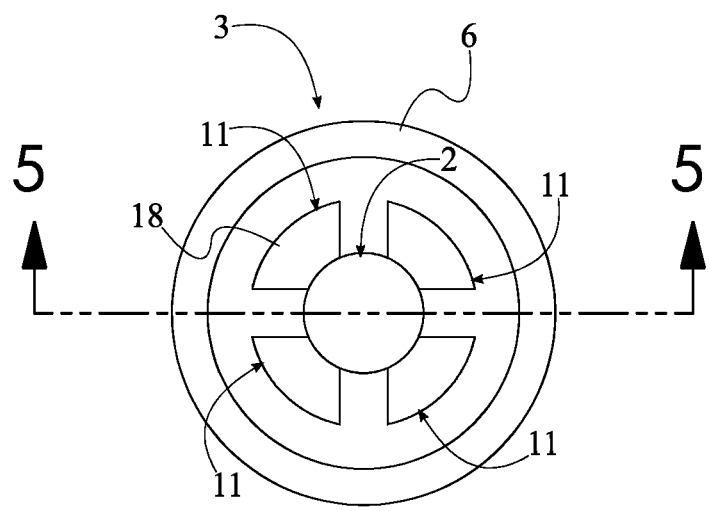
FIG. 4 is a top side view of the present invention.

The overall configuration of the aforementioned components allows the present invention to be mounted with a distributing tube of a variety of water filtration tanks. The path of the water into and out of the present invention is defined as the at least one inner tube 16 and the at least one outer tube 17 are mounted in between the first cap 3 and the second cap 4, as seen in FIG. 1, FIG. 3, and FIG. 4. More specifically, the at least one outer tube 17 is laterally positioned around and offset from the at least one inner tube 16. The at least one inner tube 16 is laterally positioned around and offset from the dispensing-tube-receiving channel 2. The structural integrity of the first cap 3 and the second cap 4 is preserved while positioned around the distributing tube of the water filtration tank as the dispensing-tube-receiving channel 2 traverses through the first cap 3 and the second cap 4. In order to filter the water within the present invention and secure the plurality of foam filters 18 within the present invention, the plurality of foam filters 18 is positioned in between the central tube and the dispensing-tube-receiving channel 2. Water from the water valve freely enter the present invention as the plurality of main inlets 11 traverses through the first cap 3. Water pressure is maintained within the present invention as, the plurality of channels 12 traverses through the second cap 4. And, water freely exits the present invention, as the plurality of main outlets 15 laterally traverses out of the at least one outer tube 17. The water flow through the present invention is continuous as the plurality of main inlets 11 is in fluid communication with the plurality of outlets through the plurality of channels 12.

Figure 2:
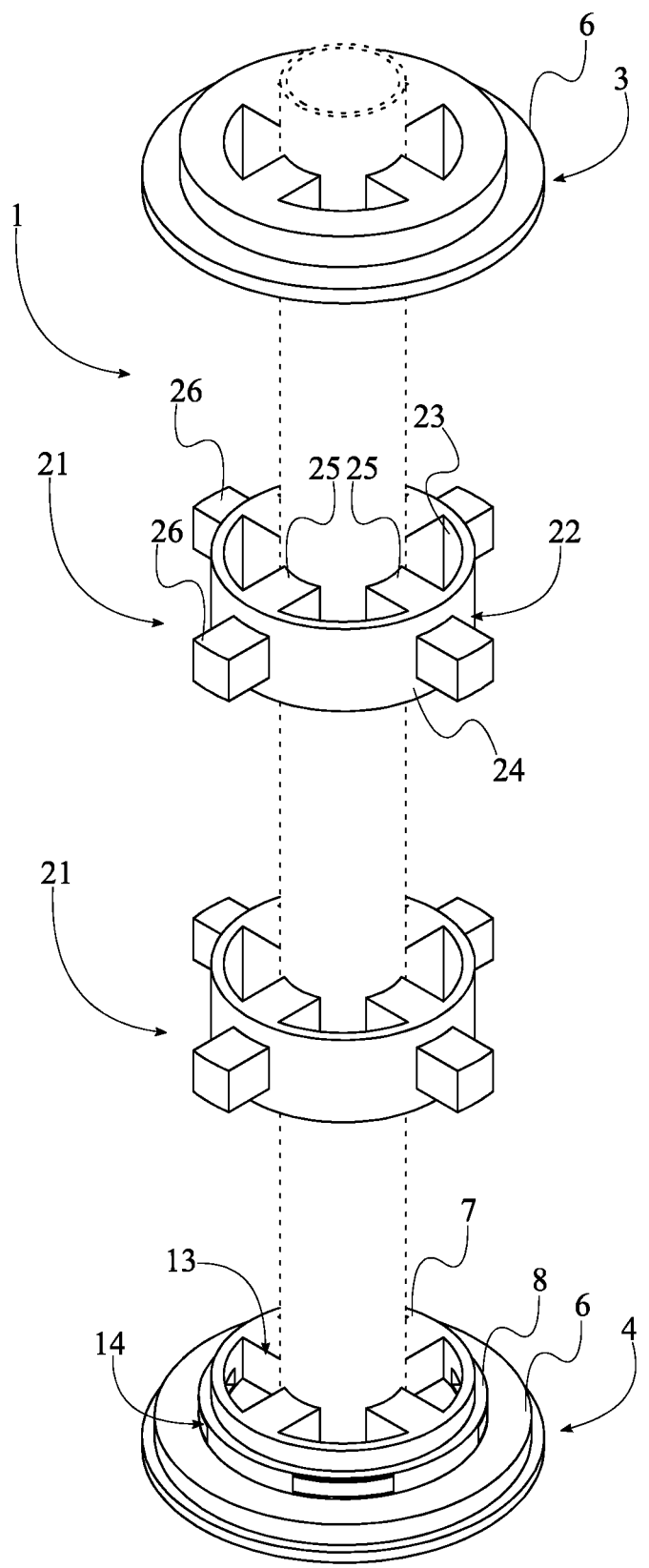
FIG. 2 is a top perspective view of a flow-management assembly and at least one ring coupler of the present invention engaged with the distributing tube.
Figure 5:
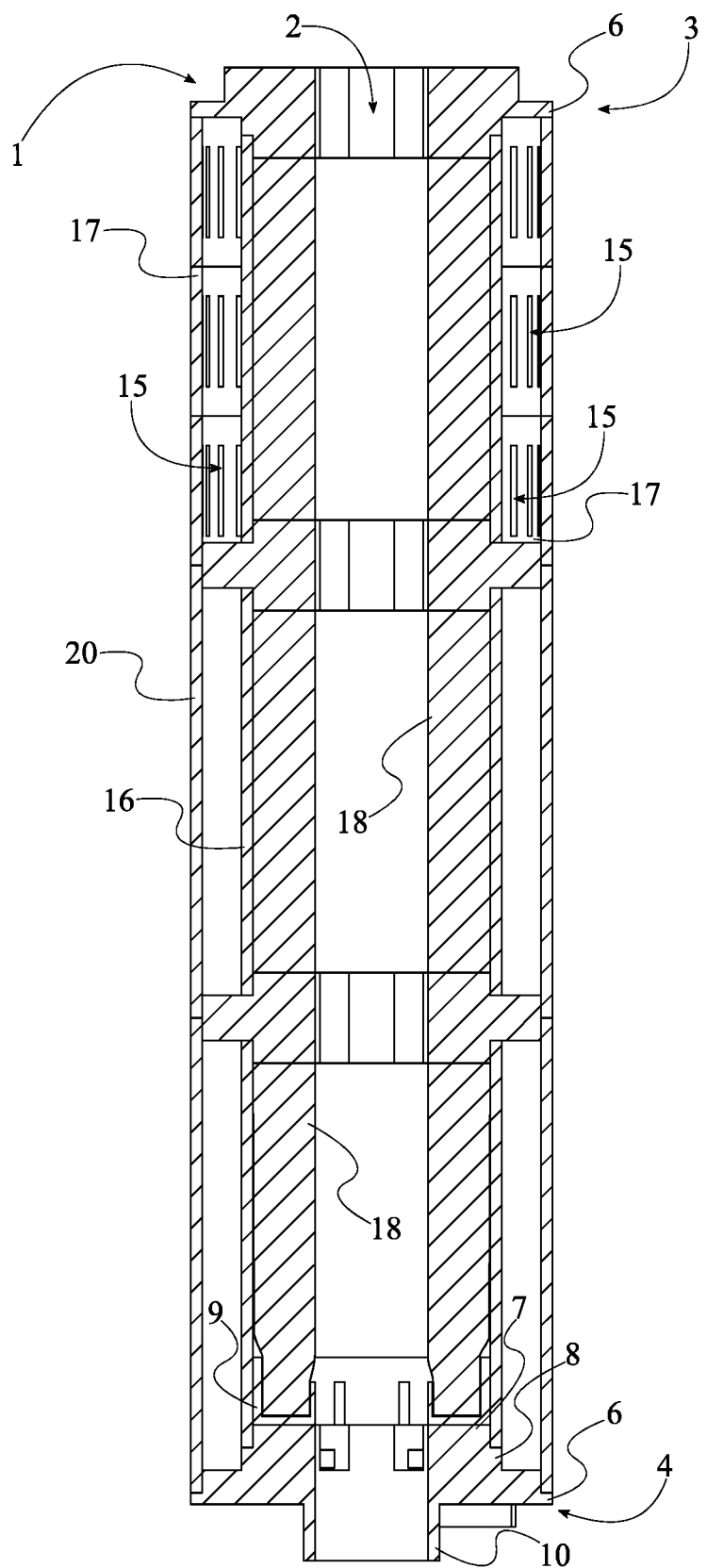
FIG. 5 is a cross-section view taken along line 5-5 in FIG. 4.

In order to secure the at least one inner tube 16 and the at least one dispenser tube around the central tube, the first cap 3 and the second cap 4 each comprise a cover 5, as seen in FIG. 2, FIG. 4, and FIG. 5. The cover 5 encloses the water traversing through the present invention and directs the flow of water along the at least one inner tube 16 and the at least one outer tube 17. The at least one inner tube 16 and the at least one outer tube 17 is positioned and sealed with the first cap 3 and the second cap 4 as cover 5 comprises a first plate 6, a second plate 7, and a base 8. The first plate 6 seals the water within the present invention, more specifically, mounts the at least one outer tube 17 between the first cap 3 and the second cap 4. The positions and seals the at least one inner tube 16 within the at least one outer tube 17. The base 8 offsets the second plate 7 with the first plate 6 in order to allow water to continuously flow from the plurality of inlets to the plurality of outlets. In order for the cover 5 to engage with the at least one inner tube 16 and the at least one outer tube 17 simultaneously, the first plate 6 is fixed adjacent with the base 8, and the second plate 7 is fixed adjacent with the base 8, opposite the first plate 6. The arrangement of the at least one inner tube 16 and the at least one outer tube 17 is defined as the first plate 6, the base 8, and the second plate 7 are positioned concentric with each other. The dispensing-tube-receiving channel 2 centrally traverses through the first plate 6, the base 8, and the second plate 7, thereby evenly balancing the present invention around the distributing tube of the water filtration tank. The water flow is defined as the at least one inner tube 16 is removably engaged with the second plate 7 of the first cap 3, and the at least one inner tube 16 is removably engaged with the second plate 7 of the second cap 4. The at least one dispenser tube is removably engaged with the first plate 6 of the first cap 3 so that the present invention may be mounted along and easily removed from the distributing tube of the water filtration tank.

As seen in FIG. 5, the second cap 4 further comprises a tube-receiving rim 10 reinforces the position of the second cap 4 around a distributing tube of the water filtration tank. The tube-receiving rim 10 is fixed adjacent with the first plate 6 of the second cap 4, opposite the base 8 of the second cap 4 and is perimetrically positioned around the dispensing-tube-receiving channel 2. This arrangement externally positions the tub-receiving rim with respect to the at least one outer tube 17 so as to not inhibit the flow of water within the present invention in any way. This arrangement also secures the second cap 4 around the distributing tube of the water filtration tank.

In the preferred embodiment of the present invention, the plurality of main inlets 11 is distributed around the cover 5 of the first cap 3 and is positioned around the dispensing-tube-receiving channel 2, as seen in FIG. 1, FIG. 2, FIG. 3, and FIG. 4. This arrangement maintains constant and even water flow into the present invention. Moreover, each of the plurality of main inlets 11 traverses through the first plate 6, the base 8, and the second plate 7 of the first cap 3. In order for the water to traverse from within the at least one inner tube 16 and into the at least one outer tube 17, each of the plurality of channels 12 comprises an entrance 13 and an exit 14. The entrance 13 receives filtered water from between a dispensing tube of the water filtration tank and the at least one inner tube 16 as the entrance 13 traverses into the second plate 7 of the second cap 4. The exit 14 laterally traverses out of the base 8 of the second cap 4 thereby releasing the filtered water between the at least one outer tube 17 and the at least one inner tube 16. The plurality of main inlets 11 is distributed about the dispensing-tube-receiving channel 2 of the second cap 4. This arrangement mirrors the arrangement of the plurality of main inlets 11 with the first cap 3 in order to maintain constant and even water flow within the present invention. Filtered water is consistently and freely released from the at least one outer tube 17 as the plurality of main outlets 15 is laterally distributed about the at least one outer tube 17. Each of the plurality of main outlets 15 positioned along the at least one outer tube 17 for maximum output. This arrangement further maintains water pressure within the present invention.

The position of the present invention is secured along a distributing tube of a water filtration tank as the present invention further comprises a valve coupler 19, as seen in FIG. 1. The valve coupler 19 also directs the water out of a water valve and towards the plurality of main inlets 11. Furthermore, the valve coupler 19 provides a continuous flow of water directly from the water valve into the plurality of main inlets 11 as the valve coupler 19 hermetically seals the present invention with an outlet of the water valve. The valve coupler 19 is positioned adjacent with the first cap 3, opposite the at least one outer tube 17 such that the valve coupler 19 is externally positioned with the at least one outer tube 17 and may directly connect with the water valve of the water filtration tank. The water flow into the plurality of inlets is not inhibited with the water valve coupler 19 as the valve coupler 19 is perimetrically fixed with the first cap 3.

In a first embodiment of the present invention, the at least one inner tube 16 is a single inner tube. The single inner tube accommodates a water filtration tank with a relatively small height. In order to position the plurality of foam filters 18 within the present invention and maintain the water flow within the present invention, the at least one inner tube 16 is hermetically connected in between the first cap 3 and the second cap 4. Likewise, the at least one outer tube 17 is hermetically connected in between the first cap 3 and the second cap 4.

A second embodiment of the present invention comprises at least one extension tube 20 and at least one ring coupler 21, as seen in FIG. 1, FIG. 3, and FIG. 5. Furthermore, the at least one inner tube 16 is a plurality of inner tubes. This second embodiment of the present invention accommodates a water filtration tank of a larger height. The at least one extension tube 20 extends the overall height of the present invention, and the plurality of inner tubes maintain the water flow and the water pressure within the present invention with respect to the overall height of the present invention. The plurality of inner tubes is connected to one another and the offset arrangement between the plurality of inner tubes with that of the at least one extension tube 20 is preserved with the at least one ring coupler 21. The at least one ring coupler 21 is interspersed amongst the plurality of inner tubes, thereby connecting each of the plurality of inner tubes with each other and stabilizing the plurality of inner tubes within the at least one outer tube 17. The plurality of inner tubes is hermetically connected in between the first cap 3 and the second cap 4, maintaining the constant water flow between a distributing tube of the water filtration tank and the plurality of inner tubes for the second embodiment of the present invention. The at least one outer tube 17 is hermetically connected to the first cap 3, and the at least one extension tube 20 is hermetically connected to the at least one outer tube 17, opposite to the first cap 3. Similarly, this arrangement maintains the constant water flow between the plurality of inner tubes and both the at least one outer tube 17 and the at least one extension tube 20. More specifically, the at least one extension tube 20 is laterally positioned around and offset from the plurality of inner tubes. The second cap 4 is hermetically connected to the at least one extension tube 20, opposite the at least one outer tube 17, sealing the filtered water within the present invention as the filtered water traverses through the plurality of channels 12 and out of the plurality of main outlets 15.

The at least one ring coupler 21 is able to connect each of the plurality of inner tubes with each other while simultaneously supporting offset arrangement between the plurality of inner tubes with the at least one extension tube 20 as the at least one ring coupler 21 comprises a ring body 22, a plurality of prongs 25, and a plurality of tabs 26, as seen in FIG. 2. The ring body 22 connects the plurality of prongs 25 with the plurality of tabs 26. Moreover, the ring body 22 connects each of the plurality of inner tubes with each other. The ring body 22 comprises an inner lateral surface 23 and an outer lateral surface 24, each of which serves to uphold the plurality of prongs 25 and the plurality of tabs 26, respectively. The plurality of prongs 25 supports the plurality of filters between each of the plurality of inner tubes. The plurality of tabs 26 offsets the plurality of inner tubes with the at least one extension tube 20. Furthermore, the plurality of tabs 26 serves as a bumper between each of the plurality of inner tubes. The plurality of prongs 25 is connected around the inner lateral surface 23 and oriented towards the dispensing-tube-receiving channel 2, thereby upholding the plurality of foam filters 18. The plurality of tabs 26 is connected around the outer lateral surface 24 in order to be positioned in between the plurality of inner tubes and the at least one extension tube 20. The plurality of inner tubes is pressed against the plurality of tabs 26, adjacent to the outer lateral surface 24 in order to be secured with the at least one ring coupler 21. The structural integrity of the second embodiment of the present invention is preserved as the at least one outer tube 17 and the at least one extension tube 20 are pressed against the plurality of tabs 26, offset from the outer lateral surface 24.

A foam filter of the plurality of foam filters 18 positioned adjacent with the second cap 4 does not fold while the present invention is not is slid onto a dispensing tube of a water filtration tank as the present invention further comprises an annular-offsetting bracket 9, as seen in FIG. 5. The annular-offsetting bracket 9 slightly compresses the adjacent foam filter against the at least one inner tube 16 in order to facilitate the insertion of the dispensing tube into the dispensing-tube-receiving channel 2. The annular-offsetting bracket 9 is positioned within the inner tube and around the dispensing-tube-receiving channel 2. Moreover, the annular-offsetting bracket 9 is pressed against the second cap 4 and is terminally engaged to the plurality of foam filters 18.

In alternate embodiments, the present invention can be provided in conjunction with at least one external filter. The at least one external filter attaches to the valve coupler 19 and is preferably attached using a custom fitting that is connected to a two-inch standard pipe with internal reticulated foam, a standard granular media, or a combination of both. The at least one external filter allows for the custom fitting to be designed to fit standard valves, i.e. Clack and Fleck, and the at least one external filter does not require any additional media housing to be used. The at least one external filter is preferably a filter which requires changing more frequently due to a limited life span. Moreover, the plurality of foam filters 18 positioned within the at least one inner tube 16 is a filter with a longer life span.

Although the invention has been explained in relation to its preferred embodiment, it is to be understood that many other possible modifications and variations can be made without departing from the spirit and scope of the invention as hereinafter claimed.

What is claimed is:

1. An internal reticulated foam filter for a water filtration tank comprises:
    a flow-management assembly;
    at least one inner tube;
    at least one outer tube;
    a plurality of foam filters;
    the flow-management assembly comprises a first cap, a second cap, a dispensing-tube-receiving channel, a plurality of main inlets, a plurality of channels, and a plurality of main outlets;
    the at least one inner tube and the at least one outer tube being mounted in between the first cap and the second cap;
    the at least one outer tube being laterally positioned around and offset from the at least one inner tube;
    the at least one inner tube being laterally positioned around and offset from the dispensing-tube-receiving channel;
    the dispensing-tube-receiving channel traversing through the first cap and the second cap;
    the plurality of foam filters being positioned in between the at least one inner tube and the dispensing-tube-receiving channel;
    the plurality of main inlets traversing through the first cap;
    the plurality of channels traversing through the second cap;
    the plurality of main outlets laterally traversing out of the at least one outer tube; and,
    the plurality of main inlets being in fluid communication with the plurality of outlets through the plurality of channels.

2. The internal reticulated foam filter for a water filtration tank as claimed in claim 1 comprises:
    the first cap and the second cap each comprise a cover;
    the cover comprises a first plate, a second plate, and a base;
    the first plate being fixed adjacent with the base;
    the second plate being fixed adjacent with the base, opposite the first plate;
    the first plate, the base, and the second plate being positioned concentric with each other;
    the dispensing-tube-receiving channel centrally traversing through the first plate, the base, and the second plate;
    the at least one inner tube being removably engaged with the second plate of the first cap;
    the at least one inner tube being removably engaged with the second plate of the of the second cap; and,
    the at least one outer tube being removably engaged with the first plate of the first cap.

3. The internal reticulated foam filter for a water filtration tank as claimed in claim 2 comprises:
    the second cap further comprises a tube-receiving rim;
    the tube-receiving rim being fixed adjacent with the first plate of the second cap, opposite the base of the second cap; and
    the tube-receiving rim being perimetrically positioned around the dispensing-tube-receiving channel.

4. The internal reticulated foam filter for a water filtration tank as claimed in claim 2 comprises:
    the plurality of main inlets being distributed around the cover of the first cap;
    the plurality of main inlets being positioned around the dispensing-tube-receiving channel; and,
    each of the plurality of main inlets traversing through the first plate, the base, and the second plate of the first cap.

5. The internal reticulated foam filter for a water filtration tank as claimed in claim 2 comprises:
    each of the plurality of channels comprises an entrance and an exit;
    the entrance traversing into the second plate of the second cap;

the exit laterally traversing out of the base of the second cap; and, the plurality of channels being distributed about the dispensing-tube-receiving channel of the second cap.

6. The internal reticulated foam filter for a water filtration tank as claimed in claim 1 comprises:

the plurality of main outlets being laterally distributed about the at least one outer tube; and, each of the plurality of main outlets positioned along the at least one outer tube.

7. The internal reticulated foam filter for a water filtration tank as claimed in claim 1 comprises:

a valve coupler;

the valve coupler being positioned adjacent with the first cap, opposite the at least one outer tube; and, the valve coupler being perimetrically fixed with the first cap.

8. The internal reticulated foam filter for a water filtration tank as claimed in claim 1 comprises:

the at least one inner tube being a single inner tube;

the at least one inner tube hermetically connected in between the first cap and the second cap; and, the at least one outer tube being hermetically connected in between the first cap and the second cap.

9. The internal reticulated foam filter for a water filtration tank as claimed in claim 1 comprises:

at least one extension tube;

at least one ring coupler;

the at least one inner tube being a plurality of inner tubes;

the at least one ring coupler being interspersed amongst the plurality of inner tubes;

the plurality of inner tubes being hermetically connected in between the first cap and the second cap;

the at least one outer tube being hermetically connected to the first cap;

the at least one extension tube being hermetically connected to the at least one outer tube, opposite to the first cap;

the at least one extension tube being laterally positioned around and offset from the plurality of inner tubes; and, the second cap being hermetically connected to the at least one extension tube, opposite the at least one outer tube.

10. The internal reticulated foam filter for a water filtration tank as claimed in claim 9 comprises:

the at least one ring coupler comprises a ring body, a plurality of prongs, and a plurality of tabs;

the ring body comprises an inner lateral surface and an outer lateral surface;

the plurality of prongs being connected around the inner lateral surface;

the plurality of prongs being oriented towards the dispensing-tube-receiving channel;

the plurality of tabs being connected around the outer lateral surface;

the plurality of inner tubes being pressed against the plurality of tabs, adjacent to the outer lateral surface; and, the at least one outer tube and the at least one extension tube being pressed against the plurality of tabs, offset from the outer lateral surface.

11. The internal reticulated foam filter for a water filtration tank as claimed in claim 1 comprises:

an annular-offsetting bracket;

the annular-offsetting bracket being positioned within the inner tube;

the annular-offsetting bracket being positioned around the dispensing-tube-receiving channel;

the annular-offsetting bracket being pressed against the second cap; and, the annular-offsetting bracket being terminally engaged to the plurality of foam filters.

12. An internal reticulated foam filter for a water filtration tank comprises:

a flow-management assembly;

at least one inner tube;

at least one outer tube;

a plurality of foam filters;

a valve coupler;

an annular-offsetting bracket;

the flow-management assembly comprises a first cap, a second cap, a dispensing-tube-receiving channel, a plurality of main inlets, a plurality of channels, and a plurality of main outlets;

the at least one inner tube and the at least one outer tube being mounted in between the first cap and the second cap;

the at least one outer tube being laterally positioned around and offset from the at least one inner tube;

the at least one inner tube being laterally positioned around and offset from the dispensing-tube-receiving channel;

the dispensing-tube-receiving channel traversing through the first cap and the second cap;

the plurality of foam filters being positioned in between the at least one inner tube and the dispensing-tube-receiving channel;

the plurality of main inlets traversing through the first cap;

the plurality of channels traversing through the second cap;

the plurality of main outlets laterally traversing out of the at least one outer tube;

the plurality of main inlets being in fluid communication with the plurality of outlets through the plurality of channels;

the valve coupler being positioned adjacent with the first cap, opposite the at least one outer tube;

the valve coupler being perimetrically fixed with the first cap;

the annular-offsetting bracket being positioned within the inner tube;

the annular-offsetting bracket being positioned around the dispensing-tube-receiving channel;

the annular-offsetting bracket being pressed against the second cap; and, the annular-offsetting bracket being terminally engaged to the plurality of foam filters.

13. The internal reticulated foam filter for a water filtration tank as claimed in claim 12 comprises:

the first cap and the second cap each comprise a cover and a tube-receiving rim;

the cover comprises a first plate, a second plate, and a base;

the first plate being fixed adjacent with the base;

the second plate being fixed adjacent with the base, opposite the first plate;

the first plate, the base, and the second plate being positioned concentric with each other;

the dispensing-tube-receiving channel centrally traversing through the first plate, the base, and the second plate;

the tube-receiving rim being fixed adjacent with the first plate, opposite the base;

the tube-receiving rim being perimetrically positioned around the dispensing-tube-receiving channel;

the at least one inner tube being removably engaged with the second plate of the first cap;

the at least one inner tube being removably engaged with the second plate of the of the second cap; and, the at least one outer tube being removably engaged with the first plate of the first cap.

14. The internal reticulated foam filter for a water filtration tank as claimed in claim 13 comprises:

the second cap further comprises a tube-receiving rim;

the tube-receiving rim being fixed adjacent with the first plate of the second cap, opposite the base of the second cap; and the tube-receiving rim being perimetrically positioned around the dispensing-tube-receiving channel.

15. The internal reticulated foam filter for a water filtration tank as claimed in claim 13 comprises:

the plurality of main inlets being distributed around the cover of the first cap;

the plurality of main inlets being positioned around the dispensing-tube-receiving channel; and, each of the plurality of main inlets traversing through the first plate, the base, and the second plate of the first cap.

16. The internal reticulated foam filter for a water filtration tank as claimed in claim 13 comprises:

each of the plurality of channels comprises an entrance and an exit;

the entrance traversing into the second plate of the second cap;

the exit laterally traversing out of the base of the second cap; and, the plurality of channels being distributed about the dispensing-tube-receiving channel of the second cap.

17. The internal reticulated foam filter for a water filtration tank as claimed in claim 12 comprises:

the plurality of main outlets being laterally distributed about the at least one outer tube; and, each of the plurality of main outlets positioned along the at least one outer tube.

18. The internal reticulated foam filter for a water filtration tank as claimed in claim 12 comprises:

the at least one inner tube being a single inner tube;

the at least one inner tube hermetically connected in between the first cap and the second cap; and, the at least one outer tube being hermetically connected in between the first cap and the second cap.

19. The internal reticulated foam filter for a water filtration tank as claimed in claim 12 comprises:

at least one extension tube;

at least one ring coupler;

the at least one inner tube being a plurality of inner tubes;

the at least one ring coupler being interspersed amongst the plurality of inner tubes;

the plurality of inner tubes being hermetically connected in between the first cap and the second cap;

the at least one outer tube being hermetically connected to the first cap;

the at least one extension tube being hermetically connected to the at least one outer tube, opposite to the first cap;

the at least one extension tube being laterally positioned around and offset from the plurality of inner tubes; and, the second cap being hermetically connected to the at least one extension tube, opposite the at least one outer tube.

20. The internal reticulated foam filter for a water filtration tank as claimed in claim 19 comprises:

the at least one ring coupler comprises a ring body, a plurality of prongs, and a plurality of tabs;

the ring body comprises an inner lateral surface and an outer lateral surface;

the plurality of prongs being connected around the inner lateral surface;

the plurality of prongs being oriented towards the dispensing-tube-receiving channel;

the plurality of tabs being connected around the outer lateral surface;

the plurality of inner tubes being pressed against the plurality of tabs, adjacent to the outer lateral surface; and, the at least one outer tube and the at least one extension tube being pressed against the plurality of tabs, offset from the outer lateral surface.

* * * * *